(12) United States Patent
Lednernez et al.

(10) Patent No.: US 11,779,436 B2
(45) Date of Patent: Oct. 10, 2023

(54) PLASMA JET DEVICE

(71) Applicant: Freiburger Medizintechnik GmbH, Freiburg (DE)

(72) Inventors: Loic Lednernez, Freiburg (DE); Michael Bergmann, Freiburg (DE); Florian Engesser, Freiburg (DE); Markus Altenburger, Freiburg (DE)

(73) Assignee: Freiburger Medizintechnik GmbH, Freiburg (DE)

( * ) Notice: Subject to any disclaimer, the term of this patent is extended or adjusted under 35 U.S.C. 154(b) by 691 days.

(21) Appl. No.: 16/967,170

(22) PCT Filed: Feb. 7, 2019

(86) PCT No.: PCT/EP2019/052978
§ 371 (c)(1),
(2) Date: Aug. 4, 2020

(87) PCT Pub. No.: WO2019/154897
PCT Pub. Date: Aug. 15, 2019

(65) Prior Publication Data
US 2021/0084742 A1   Mar. 18, 2021

(30) Foreign Application Priority Data

Feb. 7, 2018  (EP) .................................. 18155549

(51) Int. Cl.
*A61C 5/50* (2017.01)
*A61C 19/00* (2006.01)
(Continued)

(52) U.S. Cl.
CPC ................ *A61C 5/50* (2017.02); *A61C 19/00* (2013.01); *H01T 23/00* (2013.01); *H05H 1/24* (2013.01); *H05H 2277/10* (2013.01)

(58) Field of Classification Search
CPC .......... H01L 21/0228; H01L 21/02274; H01L 21/31116; H01L 21/0217; H01L 21/02211;
(Continued)

(56) References Cited

U.S. PATENT DOCUMENTS 7,608,839 B2 * 10/2009 Coulombe ............... H05H 1/34
606/41
8,758,010 B2 *  6/2014 Yamanaka ............. A61C 17/02
433/80

(Continued)

FOREIGN PATENT DOCUMENTS

| CN | 101925246 A | 12/2010 |
| CN | 104661423 A | 5/2015 |
| DE | 102004040045-63 | 2/2006 |

OTHER PUBLICATIONS

Written Opinion of the International Searching Authority for International Application No. PCT/EP2019/052978, dated May 3, 2019.
(Continued)

*Primary Examiner* — Monica C King
(74) *Attorney, Agent, or Firm* — MARSHALL, GERSTEIN & BORUN LLP; Michael P. Furmanek

(57) ABSTRACT

The present invention refers to a plasma jet device (30) for medical treatment of root canals (3) using an atmospheric pressure plasma. The device comprises a handle (40) and a probe (50) with a gas channel (54) and a first and second electrode (31, 32). The probe (50) has a first end connected to the handle (40) and a second end opposite to the first end being a probe tip. The first electrode (31) extends to the probe tip. The first electrode (31) is a hollow outer electrode and the second electrode (32) is an inner electrode extending at least along a section of the first electrode (31) inside the first electrode (31). The second electrode (32) except for a portion at its end is surrounded by a dielectric material (33).

(Continued)

The probe (50) is adapted to be inserted into a root canal (3). The plasma jet device (30) is adapted to provide negative pulses at the second electrode (32) for producing the atmospheric pressure plasma at the tip of the second electrode (32). The invention further refers to a method for generating atmospheric pressure plasma.

15 Claims, 5 Drawing Sheets

(51) Int. Cl.
    *H01T 23/00*      (2006.01)
    *H05H 1/24*      (2006.01)

(58) Field of Classification Search
CPC .......... H01L 21/02164; H01L 21/0234; H01L 21/31111; H01L 21/67069; H01L 21/3065; H01L 21/31138; H01L 21/32136; H01L 22/26; H01L 21/02219; H01L 21/0332; H01L 21/0337; H01L 21/31122; H01L 21/67253; H01L 21/02129; H01L 21/02178; H01L 21/02194; H01L 21/022; H01L 21/02362; H01L 21/0335; H01L 21/0338; H01L 21/28088; H01L 21/28562; H01L 21/3105; H01L 21/32051; H01L 21/32137; H01L 21/67167; H01L 21/67201; H01L 29/4966; H01L 29/78; H01L 21/02049; H01L 21/02126; H01L 21/0214; H01L 21/02167; H01L 21/02172; H01L 21/02175; H01L 21/02247; H01L 21/02263; H01L 21/02332; H01L 21/02359; H01L 21/0273; H01L 21/0274; H01L 21/2254; H01L 21/2255; H01L 21/2256; H01L 21/28518; H01L 21/30621; H01L 21/30655; H01L 21/3086; H01L 21/3088; H01L 21/31144; H01L 21/324; H01L 21/67109; H01L 21/6831; H01L 21/68742; H01L 21/76826; H01L 21/76831; H01L 23/3192; H01J 37/32082; H01J 37/32183; H01J 37/32926; H01J 37/32935; H01J 2237/334; H01J 37/32449; H01J 37/32532; H01J 37/3255; H01J 37/32972; H01J 37/3299; H01J 37/32146; H01J 37/32174; H01J 37/32623; H01J 2237/3347; H01J 27/16; H01J 37/321; H01J 37/32119; H01J 37/32192; H01J 37/32357; H01J 37/3244; H01J 37/32963; H01J 2237/002; H01J 2237/061; H01J 2237/0817; H01J 2237/21; H01J 2237/2811; H01J 2237/2817; H01J 2237/31749; H01J 2237/31776; H01J 2237/332; H01J 2237/3323; H01J 2237/3341; H01J 2237/3344; H01J 2237/335; H01J 37/08; H01J 37/244; H01J 37/3007; H01J 37/3026; H01J 37/3053; H01J 37/3174; H01J 37/32009; H01J 37/32091; H01J 37/32137; H01J 37/32155; H01J 37/3222; H01J 37/32568; H01J 37/32715; H01J 37/32733; H01J 37/32816; H01J 37/32862; H01J 37/32917; H01J 49/0031; H01J 49/0409; H01J 49/049; H01J 49/102; H01J 49/105; H01J 49/161; H05H 1/46; H05H 1/2406; H05H 2242/26; H05H 2245/34; H05H 1/2465; H05H 1/466; H05H 1/245; H05H 1/246; H05H 1/4652; H05H 1/4697; H05H 2240/20; H05H 2245/30; H05H 2245/32; H05H 2245/36; H05H 2277/10
See application file for complete search history.

(56) References Cited

U.S. PATENT DOCUMENTS

| | | | |
|---|---|---|---|
| 9,028,656 B2* | 5/2015 | Koo | A61C 19/066 204/164 |
| 9,272,359 B2* | 3/2016 | Koo | H05H 1/2406 |
| 10,157,729 B2* | 12/2018 | Valcore, Jr. | H01J 37/32082 |
| 2011/0139748 A1* | 6/2011 | Donnelly | H01J 37/32045 216/37 |
| 2015/0238248 A1* | 8/2015 | Thompson | A61B 18/042 606/50 |
| 2021/0084742 A1* | 3/2021 | Ledernez | A61C 19/00 |
| 2021/0115211 A1* | 4/2021 | Allain | A61L 31/022 |

OTHER PUBLICATIONS

International Search Report for International Application No. PCT/EP2019/052978, dated May 3, 2019.

* cited by examiner

PLASMA JET DEVICE

CROSS-REFERENCE TO RELATED APPLICATIONS

This is the United States national phase of International Patent Application No. PCT/EP2019/052978, filed Feb. 7, 2019, which claims priority to EP 18155549.1, filed Feb. 7, 2018, the entire contents of each of each of which are hereby incorporated by reference herein.

FIELD OF THE DISCLOSURE

The present disclosure relates to a plasma jet device and, more particularly, a plasma jet device for a medical treatment of root canals using an atmospheric pressure plasma, as well as a method for generating atmospheric pressure plasma.

BACKGROUND

Atmospheric pressure plasma and especially non-thermal atmospheric pressure plasma has been used since the early 2000s in the medical field, for example, for tissue treatment. A plasma device for surface processing and tissue treatment is known from US 2015/0238248 A1. The plasma device has an elongated body defining a lumen therethrough and a first electrode and a second electrode. An ionized media source is in fluid communication with the lumen and configured to supply ionizable media thereto. A variable frequency energy source is adapted to be coupled to the first and second electrodes and configured to supply energy to the first and second electrodes sufficient to ignite ionizable media supplied by the ionizable media source to generate a plasma influent. A frequency of the energy is adjustable to modify at least one property of the plasma effluent. The plasma is produced by DC or AC pulses, especially by applying low DC or AC pulses to the electrodes of the instruments at low duty cycles.

U.S. Pat. No. 7,608,839 B2 discloses a plasma source, more specifically a miniature atmospheric pressure plasma source in form of a plasma torch. The low power atmospheric pressure plasma source comprises a ground electrode provided on an external surface of a dielectric plasma confinement tube and a capillary electrode centered inside such ground electrode. AC current with a frequency of 13.56 MHz excitation voltage is applied to the torch.

When using probes having a concentrically arranged electrode at the probe tip, the lifetime especially of the inner electrode is very limited. This becomes even more relevant when the diameters of the torch are very small and the two electrodes are arranged closely to each other. In such cases the lifetime of a torch is generally not sufficient for a treatment of a root canal.

DE 10 2004 040 045 B3 discloses an apparatus for dental treatment, especially for the treatment of root canals and gingival sulci. In one embodiment, the apparatus comprises a first outer electrode and an electrical probe having a flexible probe part, which is embedded in an insulator in such a way that the end of the wire serving as second inner electrode is exposed. In a second embodiment, a monopolar probe is used having only a second inner electrode but not the first outer electrode. For treatment of a root canal the probe comprising the second inner electrode protruding from the first outer electrode is inserted into the root canal.

A drawback of the arrangement where only one electrode is used for the plasma jet device or only one electrode is arranged at the probe tip is that the spot where the plasma is created and the extension of the plasma is very indefinite.

One aim of the present invention is to provide a plasma jet device for medical treatment especially of root canals having a defined spot where the plasma is created as well as a defined extension thereof. A further object of the present invention is to provide a plasma jet device with a probe having a lifetime being sufficient for the treatment of a root canal.

One aspect of the present invention is a plasma jet device for the treatment of root canals using an atmospheric pressure plasma. The device comprises a handle and a probe with a gas channel and a first and second electrode. The probe has a first end connected to the handle and a second end opposite to the first end being a probe tip. The first electrode extends to the probe tip. The first electrode is a hollow outer electrode and the second electrode is an inner electrode extending at least along a section of the first electrode inside the first electrode. The second electrode except for a portion at its end is surrounded by a dielectric material. The probe is adapted to be inserted into a root canal. The plasma jet device is adapted to provide negative pulses at the second electrode for producing the atmospheric pressure at the tip of the second electrode.

In a second aspect the probe has a first end connected to the handle and a second end opposite to the first end, the second end being a probe tip having a first electrode, a second electrode and a gas channel with an outlet at the probe tip. The second electrode is surrounded by a dielectrical material except for a portion at the probe tip.

Each of the probe and the two electrodes have a first end adjacent to the handle and an opposite end being its tip. In a further aspect of the present invention the first electrode may have an annular cross section. The first electrode may alternatively have an oval, rectangular or quadratic outer shape. The material thickness of the outer electrode may be constant in longitudinal direction as well as in circumferential direction or may vary in at least one of the two directions which are generally arranged orthogonally to each other. When having an annular cross section with a constant thickness in both longitudinal and circumferential direction, the first electrode is of a tubular shape. Alternatively, the first electrode may be of a conical shape tapering towards the probe tip. A conical shape may facilitate the insertion of the probe into the root canal and improve the mechanical stability of the probe.

The second electrode may be arranged coaxially to the first electrode. In case the electrodes are axially symmetric along the longitudinal direction, the longitudinal axes of both electrodes may be identical. Otherwise, the axis of balance points may serve as reference for defining the coaxial arrangement of the two electrodes. The longitudinal axes of the electrodes may also be arranged parallel to each other.

According to one aspect of the present invention, the distance between the first and the second electrode, especially at the tip of the probe, is between 10 microns and 300 microns. The tip of the probe may be designed such, that the ends of the first and the second electrode are arranged on the same level. Accordingly, the non-thermal atmospheric pressure plasma is produced at the tip of the second electrode. Alternatively, the inner electrode may be recessed, i.e. the end is inside the hollow outer electrode.

The second electrode may extend only along a section of the first electrode inside the first electrode. The section, which generally extends from the handle or a connector to the handle towards the tip of the probe, may have length of at least 5 percent, preferably at least 25 percent, preferably at least 50 percent, more preferably at least 75 percent of the length of the first electrode. The second electrode may extend to the tip of the probe. The second electrode does not protrude from the first electrode extending to the tip of the probe. The shorter the distance between the probe tip and a tip of the second electrode, the shorter is the distance between the spot where the plasma is produced and its site of action which may lead to an enhanced effect of the plasma.

In one aspect of the invention the first electrode may be designed as a conical tube. This shape allows a second electrode of a larger diameter being inserted from the first end. The second electrode may be designed as a solid electrode, for example, a wire, a conductor or may have any suitable shape including a hollow shape in cross section.

According to one aspect of the invention an outer diameter of the probe may be less than 1.8 mm, preferably less than 1.0 mm and more preferably less than 0.5 mm. When having a non-symmetrical cross section, the outer diameter of the probe may be defined by the largest extension in a plane orthogonally to the longitudinal direction of the probe. The outer diameter of the probe may be one relevant aspect with regard to the insertion of the probe into the root canal. Typically, a root canal of a tooth is about 2 cm long and is of a tapering shape towards the jaw bone. The length of the probe may be adapted to the typical dimensions of a human root canal. Preferably, the probe may be inserted into the root canal until it reaches the end of the canal. Accordingly, the probe may have a length of two or more centimeters.

Alternatively, the second electrode may be a conductor on or in a substrate. The substrate may be basically of a rectangular cross section and adapted to the inner shape of the first electrode. Preferably, the substrate may be attached at two opposite surfaces to the inner surface of the first electrode. In this case the substrate may serve as dielectric material. Additionally, it serves as a spacer or separator and fixes the second electrode in a predefined position with regard to the first electrode.

According to one aspect of the invention at least one of the electrodes comprises at least one element selected from the group consisting of copper, stainless steel, silver, gold, platinum, tantalum, brass, titanium, silicon, tungsten, nickel, molybdenum and ceramic. The first and the second electrode may consist of identical or different material compositions. The composition of the electrode material may be selected on basis of cost-effectiveness, lifetime in use and the parameters for the generation of plasma.

According to a further aspect the dielectric material may be one of a varnish, ceramic, silicon or a polymer. It may further serve as a spacer for positioning the second electrode relative to the first electrode. In one embodiment the dielectric material may be a substrate on which a conductor is applied. The conductor being the second electrode may be surrounded by the substrate. Alternatively, the conductor may be applied to a surface of the substrate and coated with a dielectric material, for example a varnish. Other embodiments of a dielectric material may be a varnish, especially a polymer varnish or a polymer coating, for example a powder coating or polyamide. In case the outer diameter of the dielectric material is smaller than the inner diameter of the first electrode, the thickness of the dielectric material, for example the coating or the varnish, defines the minimum distance between the two electrodes. The dielectric material may be arranged such that only the front face of the second electrode is bared and not covered by the dielectric material. Additionally, the circumferential surface at the probe tip of the second electrode may also be partially or fully bared. The tip of the second electrode may be partially bared such, that the spot of plasma production is predefined by the opening in the dielectric material.

The dielectric material may also be designed as a spacer for positioning the second electrode relative to the first electrode. In this case the spacer may have at least two contact points or contact surfaces aligning with the inner surface of the first electrode. The spacer may be arranged along the complete longitudinal extension of the probe or at least parts thereof. The spacer may also contain at least one gas line supplying gas to the gas channel or building the gas channel. Preferably, the gas lines are arranged symmetrically between the first and the second electrode. Alternatively, the space between the second electrode/the dielectric material and the first electrode may serve as a gas channel.

According to one aspect of the present invention the negative pulses have at least a current magnitude of 0.1 to 350 mA. According to a further aspect the negative pulses may have a frequency of 1 Hz to 4 kHz. The negative pulses may be of a rectangular, parabolic, saw tooth or sinus shape. The pulse may also be a combination of at least two of the shapes. In all cases the pulses are negative, monopolar pulses but not bipolar pulses. Accordingly, the voltage applied to the second, inner electrode is always zero or negative. Between two negative pulses, no current is flowing and especially no positive pulses are applied to the electrodes. Preferably, the second electrode is connected via a voltage generator with ground. The first electrode may be connected directly with ground. In order to obtain said current magnitude, which is the impacting factor for the number of radicals in the plasma produced, the negative pulses may have a voltage magnitude of greater than 300V, preferably of about 600V to 1200V. The negative voltage pulses are applied to the second electrode.

According to one aspect of the invention the probe may be detachable from the handle and replaceable. The detachability of the probe from the handle provides a way of easily meeting medical standards in regard to hygiene. A new probe may be used for each patient or even each root canal or tooth. The joint surfaces between the handle and the probe may provide electrical connections in a connector for the two electrodes as well as a connection for the gas channel. The connector may also contain suitable connections to securely attach the probe to the handle. The electrodes may extend from the connector towards the probe tip and to their own tips.

The handle of the plasma jet device may have control elements for controlling the gas flow and/or the negative pulse generation. The controlling may include the starting and stopping thereof as well as setting parameters of the plasma like beam length.

According to a further aspect of the invention a system may be provided comprising a plasma jet device and a base station electrically connected to the plasma jet device and adapted to generate negative pulses. The base station may include an electrical circuit for generating negative pulses. The base station may further comprise means for controlling and setting the parameters of the negative pulses.

According to a further aspect of the invention the system may also include a gas reservoir for providing gas to the gas channel. In this case the connection may also include a connection for gas, for example a tube. The gas reservoir may be a tank having an outlet for providing a predefined pressure, flow rate and/or volume of gas. The base station may also comprise means for controlling the gas flow as well as the composition of the gas. The amount of gas provided may correlate to the voltage applied to the electrodes and/or the magnitude of the electric current. Accordingly, the amount of gas as well as the voltage applied has an influence on the generation of plasma, for example, the length of the plasma beam.

A further aspect of the present invention is a method for generating atmospheric pressure plasma. The method comprises providing a plasma jet device comprising a probe with a gas channel and a first and second electrode, the probe having a second end being a probe tip. The first electrode extends to the probe tip. The first electrode is a hollow outer electrode and the second electrode is an inner electrode extending at least along a section of the first electrode inside the first electrode. The second electrode except for a portion at its end is surrounded by a dielectric material. The probe is adapted to be inserted into a root canal. The method further comprises guiding a gas towards the probe tip and generating negative pulses at the second electrode for producing the atmospheric pressure plasma at the tip of the second electrode.

In a further aspect the method comprises providing a plasma jet device with a probe having a second end and being a probe tip having a first electrode and a second electrode. The second electrode is surrounded by a dielectrical material except for a portion at its end. The probe is further adapted to be inserted into a root canal.

When treating a tooth and especially a root canal of a tooth the tip of the probe is inserted into the root canal. The plasma is generated within the cavity of the tooth, for example the root canal. The plasma being generated within the root canal expands into the root canal as well as the dentinal tubules killing bacteria and germs and sterilizing the cavity. Additionally, extra-cellular polysaccharides are inactivated.

At the tip of the second electrode a low temperature atmospheric pressure plasma is generated. In literature, low temperature plasma is often classified as non-thermal plasma. Ions and neutrals of non-thermal plasma may have room temperature or a temperature slightly above room temperature whereas the electrons have a much higher temperature.

Generally, the gas temperature should not exceed 42° C., preferably should not exceed 39° C., in order to not heating up the surrounding, especially the tooth, significantly. The parameters of the negative pulses like amplitude, frequency and duty cycle are set accordingly.

According to one aspect of the invention the gas guided to the probe tip especially in a gas channel comprises at least one gas selected from a group consisting of oxygen and inert gases. As inert gases helium, neon, argon or nitrogen may be used. Also a combination of at least two of the previously mentioned inert gases may be used. The inert gases may also be mixed with oxygen. The amount of gas, especially the flow rate of the gas, as well as the composition of the gas define the number of activatable particles which may be ionized.

In one aspect of the present invention the method is used with a plasma jet device previously described and may also be used in a system comprising a plasma jet device.

A further aspect of the present invention concerns said method of generating atmospheric pressure plasma for medical treatment of a root canal and more preferably the disinfection of root canals. For this purpose, the probe tip is inserted into the root canal.

One advantage of applying negative pulses to the inner electrode is a lower temperature curve compared to applying positive pulses having the same absolute voltage value. Especially for a medical treatment of a root canal it is important that the temperature within the tooth does not exceed 42° C. Otherwise, the tooth may be harmed.

A further advantage of applying negative pulses to the inner electrode is an improved lifetime. Tests have shown that the lifetime of the probe has been multiplied when applying negative pulses instead of positive pulses to probes having an identical design. In one test cycle the lifetime of a probe was 4:41 minutes with a standard deviation of 2:19 minutes when applying positive pulses. When applying negative pulses, with an identical profile mirrored at the x-axes, the lifetime exceeded 15 minutes. Accordingly, a typical treatment for sterilizing a root canal with the duration of 5 to 10 minutes may be guaranteed. A failure of the probe in the test cycle with positive pulses mainly occurred due to a failure of the isolation of the inner electrode.

BRIEF DESCRIPTION OF THE DRAWINGS

Preferred embodiments of the invention are described by the way of example only, with reference to the accompanying drawings in which.

DETAILED DESCRIPTION

Figure 1:
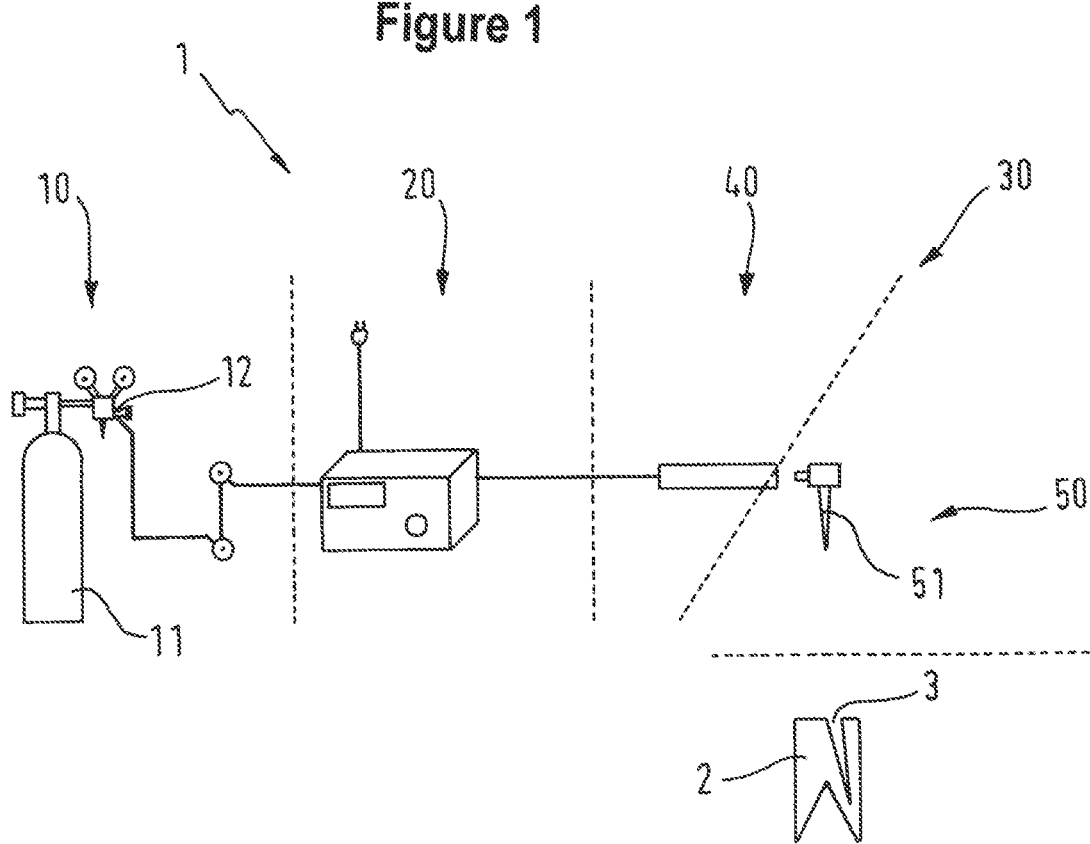
FIG. 1 shows a schematic arrangement of a system comprising a plasma jet device for medical treatment of root canals using atmospheric pressure plasma.

FIG. 1 shows a schematic arrangement of a system 1 with a plasma jet device 30 for medical treatment of root canals 3 using non-thermal atmospheric pressure plasma. The system 1 comprises a gas supply 10. The gas is stored in a pressurized gas cylinder 11 having an outlet 12 for supplying gas to a main unit 20. In an alternative embodiment the gas supply 10 is an air preparation apparatus using ambient air and processing it in order to provide a sufficient amount of activatable particles for producing plasma. Additionally, the air preparation apparatus may contain a device for sterilizing the ambient air.

The main unit 20, which also may be considered as a base station, is controlling the amount of gas to be supplied. One further function of the main unit 20 is the generation of negative pulses. The gas and the negative pulses are supplied to the plasma jet device 30 consisting of a hand piece 40 and a mouth piece 50. The mouth piece 50 having a probe 51 is detachable from the handle 40. This allows to adhere to the standards in regard to the sterility of medical devices. The probe 51 of the mouth piece 50 is inserted into a root canal 3 of a tooth 2 during the treatment in order to sterilize the root canal 3 as well as the dentinal tubules.

Figure 2:
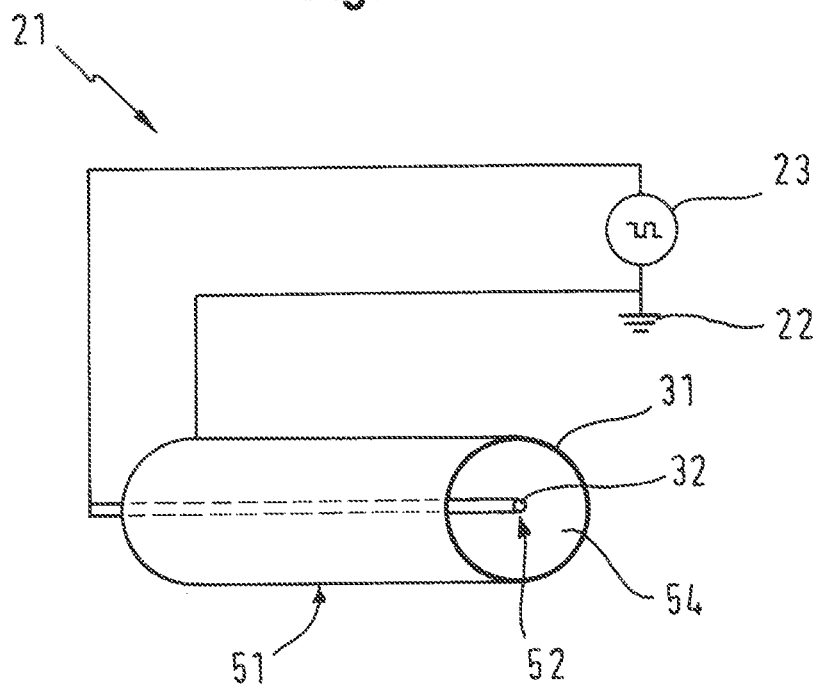
FIG. 2 shows an electric circuit for delivering negative pulses to a probe.

FIG. 2 shows an electric circuit 21 of the main unit 20 and the plasma jet device 30. A first, outer electrode 31 of the plasma jet device 30 is connected with ground 22. Via a voltage generator 23, negative pulses may be applied to the second, inner electrode 32. Between the first electrode 31 and the second electrode 32 a gas channel 54 is arranged in order to provide ionizable particles in order to generate plasma between the first and second electrodes 31, 32 at a tip 52 of a probe 51.

Figure 3:
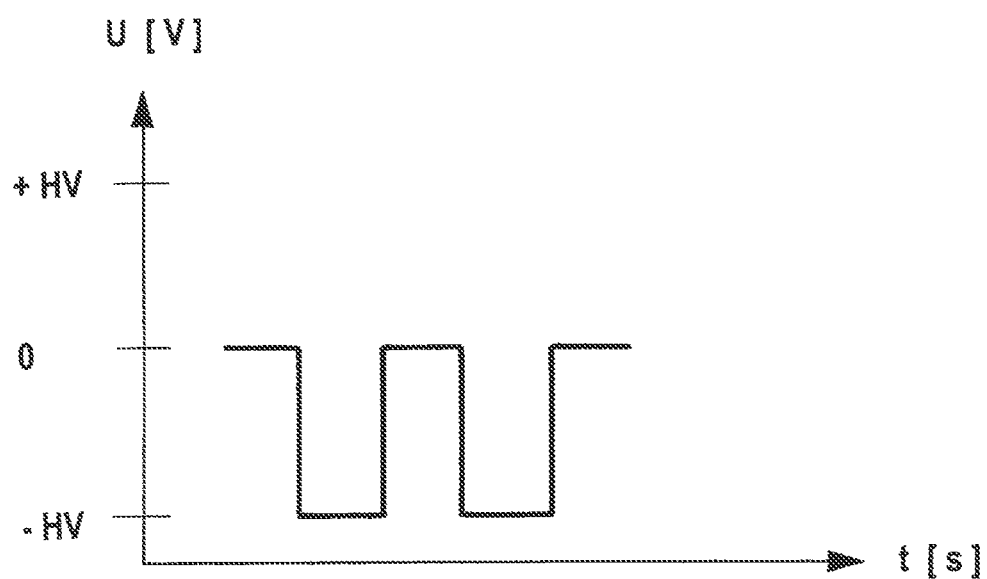
FIG. 3 illustrates negative pulses having a rectangular shape.

FIG. 3 shows a diagram with an ideal rectangular profile of negative voltage pulses applied to the second electrode 32 via the voltage generator 23. The negative pulses have, compared to positive pulses applied to the second, inner electrode 32, advantages in regard to the lifetime of the second electrode 32.

Figure 4:
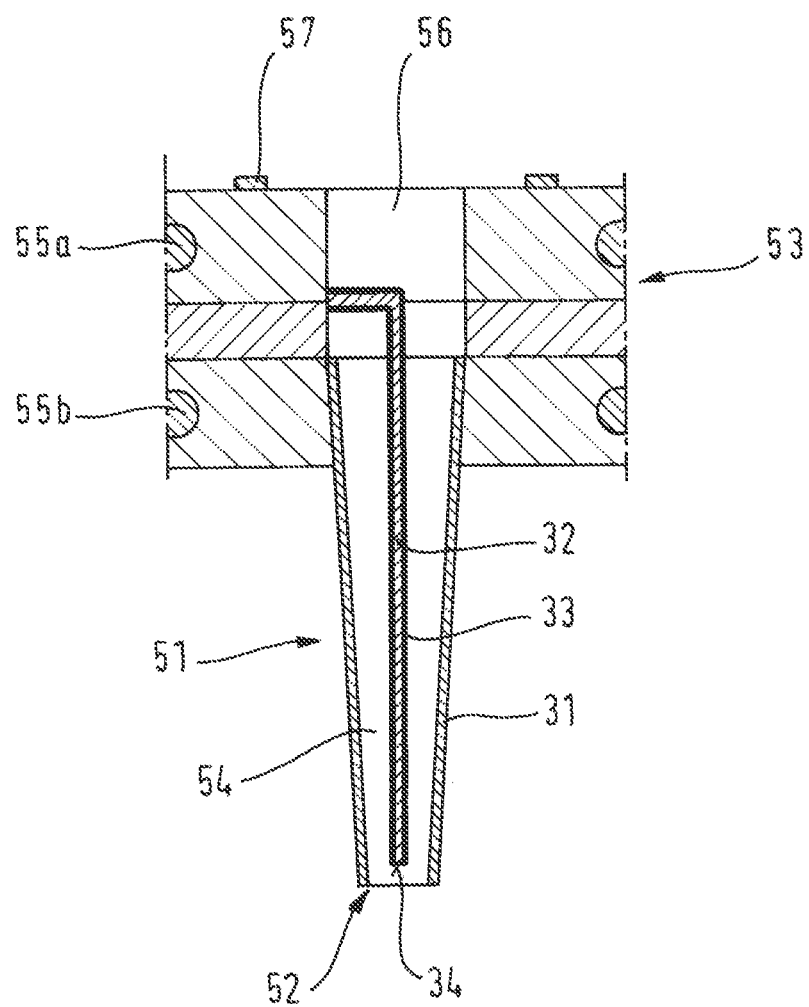
FIG. 4 shows one embodiment of a probe.

FIG. 4 shows one embodiment of a mouth piece 50 having a probe 51. An annular cavity is arranged between the first electrode 31 and the second electrode 32 and the dielectric material 33, respectively, serving as a gas channel 54. The outer electrode 31 of the probe 51 is of a tapered shape facilitating the insertion of the probe 51 into the root canal 3. Additionally, the tapered shape increases the stability of the probe at a first end at a connector 53. The flexural rigidity is decreasing towards the second end opposite to the first end. A certain flexibility of the probe may facilitate inserting it into the root canal 3 which is typically not straight. The tip 52 is located at the second end. As shown, the inner electrode 32 is recessed compared to the outer electrode 31 and covered by a varnish serving as a dielectric material 33. The offset of the inner and outer electrode 31, 32 is in this embodiment about 1 mm. Only the front surface 34 of the inner electrode 32 is not covered by the dielectric material 33. Accordingly, a plasma is generated at the end of the inner electrode at tip 52 of the probe 51 between the exposed areas of the electrodes.

The mouth piece 50 further comprises a connector 53 for connecting the mouth piece 50 with the hand piece 40. The connector 53 contains electrical connectors 55a and 55b for connecting the first and second electrodes 31, 32 with the corresponding electrical lines of the hand piece 40. The connector 53 further comprises a gas inlet 56. The gas inlet 56 is sealed via a sealing 57 such that the gas may be supplied through the gas channel 54 towards the probe tip 52. The mouth piece 50 is via the connector 53 detachable from and attachable to the hand piece 40 and may be secured safely therewith.

Figure 5:
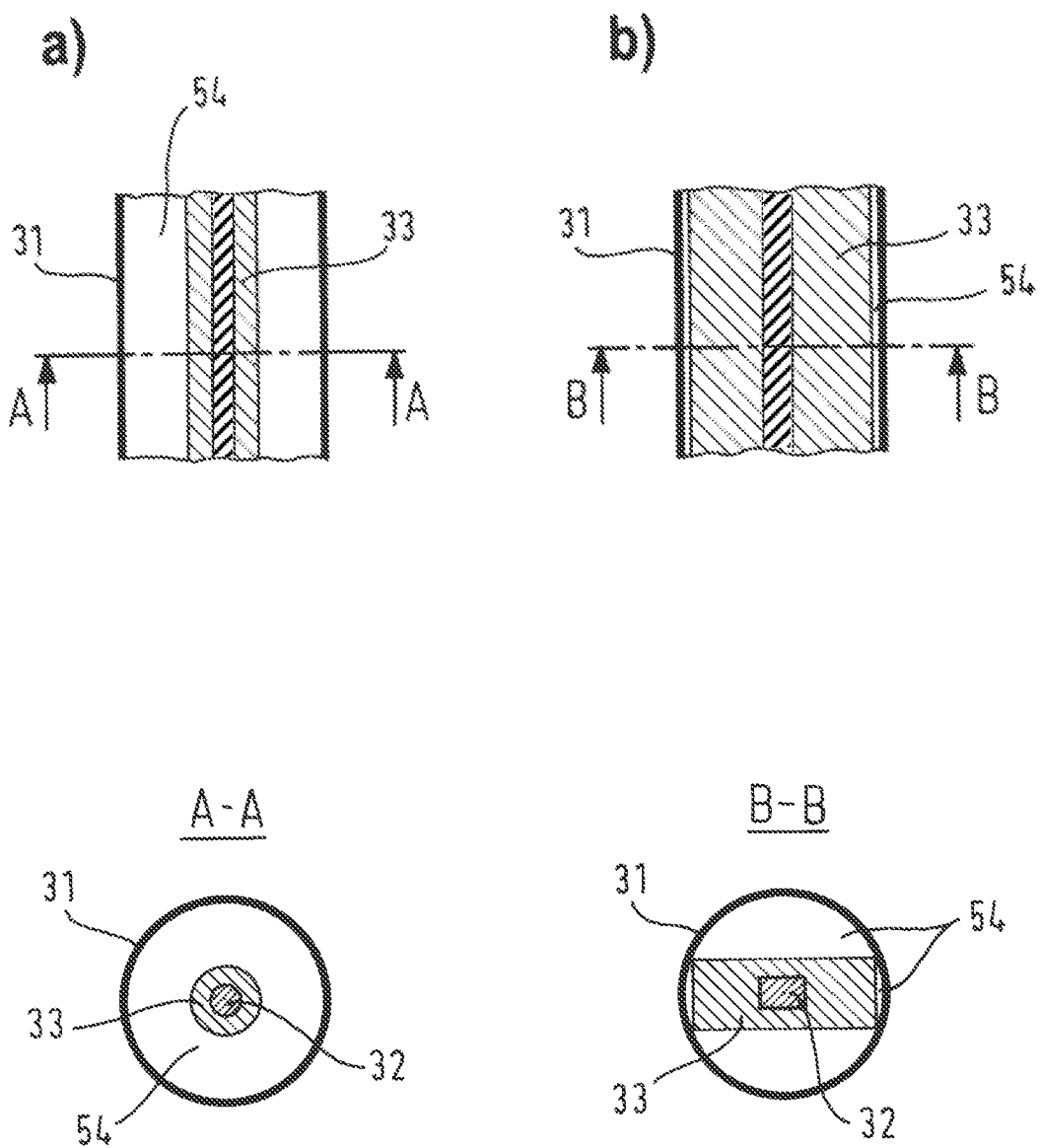
FIGS. 5a, b illustrates alternative cross sections of a probe.

FIG. 5 shows two alternative configurations of a probe 51 according to the invention. Each of the two FIGS. 5a and 5b shows a cross section along the longitudinal axis of the probe 51. At the bottom, both Figures show a cross section along plane A-A and B-B respectively. In contrast to the embodiment of FIG. 4, the embodiments shown in FIG. 5 have a first electrode 31 in form of a hollow cylinder with a constant diameter. Two different configurations of the second electrode 32 surrounded by the dielectric material 33 are shown, whereas in FIG. 5a on the left side the inner electrode 32 is a cylindrical wire surrounded by the dielectric material 33 and in FIG. 5b on the right side the inner electrode 32 is of a rectangular shape. It may be understood by a person skilled in the art that the various combinations of inner electrode and dielectric material shapes are applicable, e.g. the dielectric material 33 shown in FIG. 5b with a cylindrical inner electrode 32. In FIG. 5b the dielectric material 33 is arranged almost along the complete diameter of the hollow inside of the outer electrode 31. At the four edges the rectangular dielectric material 33 is in contact with the inner surface of the first electrode 31 such, that the position in radial direction is defined and fixed. In FIG. 5a, an annular cavity between the first electrode 31 and the dielectric material 33 surrounding the second electrode 32 is provided serving as gas channel 54. In contrast, the gas channel 54 in FIG. 5b is separated into four sections.

Figure 6:
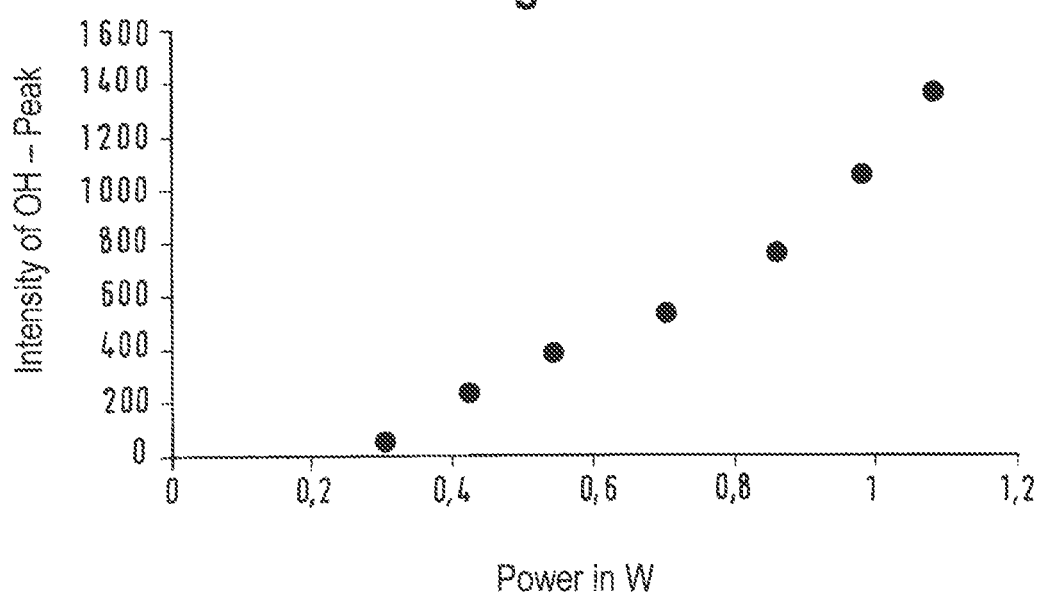
FIG. 6 shows a diagram of the intensity of OH peaks over power.

One parameter for characterizing the plasma is the amount of radicals, i.e. of OH-radicals. The higher the amount of radicals, the better is the disinfecting effect of the low temperature plasma. In an experimental setup of a plasma jet device having an outer electrode 31 consisting of stainless steel with a diameter of 1.27 mm and an inner electrode 32 consisting of copper with a diameter of 0.55 mm, the intensity of the OH-radicals has been measured by the way of emission spectroscopy. In the setup power in form of positive pulses is applied to the inner electrode 32 whilst the outer electrode 31 is connected to ground. Helium is supplied through the channel 54 and flowing at a constant volume flow rate of 1 l/min. The intensity of the characteristic 309 nm peak is shown in FIG. 6 over power applied to the plasma jet device. With increasing power applied the intensity of the OH-peak is increasing as well.

Figure 7:
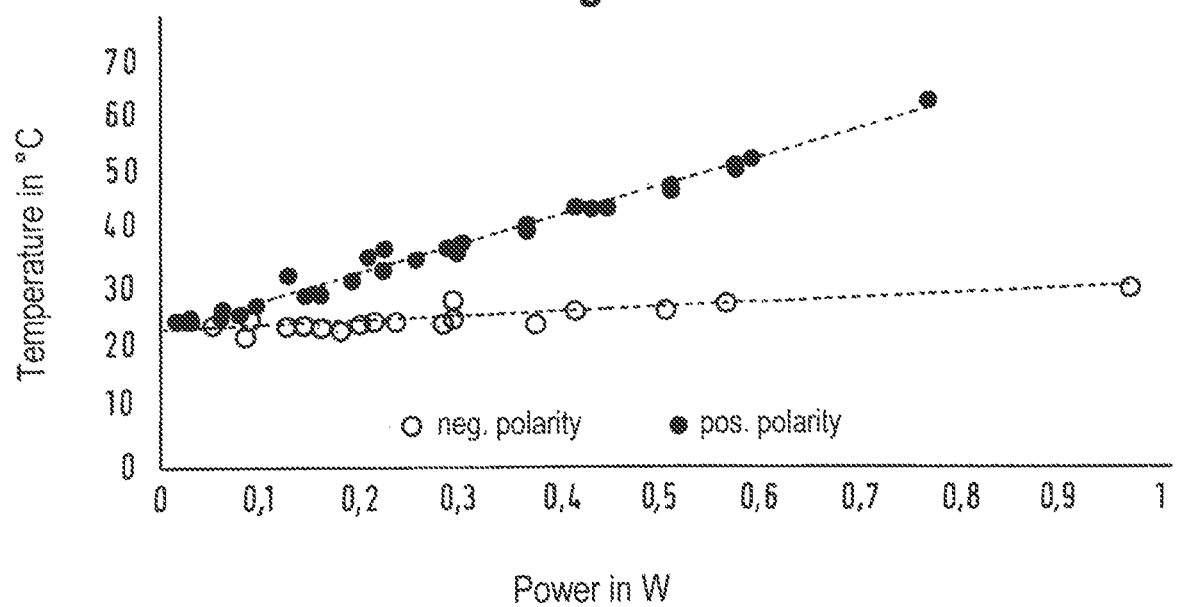
FIG. 7 shows a diagram of temperature over power.

A limiting factor for increasing the power applied to the plasma jet device is the temperature of the plasma and the increase of the temperature of the tooth incurred. As indicated above, the temperature in one embodiment should not exceed 39° C. Surprisingly, the plasma jet device may be energized with more power when negative pulses are applied to the inner electrode instead of positive pulses. As can be seen in FIG. 7, the temperature of 39° C. is exceeded when applying positive pulses with a power of 0.3 W. In contrast, with negative pulses applied to the inner electrode, a temperature of 39° C. is not reached even when the power is tripled. As can be seen in FIG. 7, the temperature is still below 30° C. when applying 1 W. A temperature of 39° C. would be reached when applying more than 2 W.

In one embodiment, pulses with a frequency of 1 kHz, a pulse width of 10 microseconds and a voltage of 1000 V are applied to the plasma jet device. When using negative pulses at the inner electrode, a steady temperature of 27° C. is reached and when with positive, a temperature of 47° C. is reached.

Surprisingly, the negative polarity of the inner electrode leads to a decrease in the temperature development compared to a positive polarity of the outer electrode. Correspondingly, the negative polarity of the inner electrode allows an increase of power applied to the plasma jet device and hence, to a higher generation of radicals, thus to a more efficient disinfection of the root canals.

The invention claimed is:

1. A plasma jet device (30) for medical treatment of root canals (3) using an atmospheric pressure plasma comprising
   a handle (40); and
   a probe (50) with a gas channel (54) and a first and second electrode (31, 32), the probe (50) having a first end connected to the handle (40) and a second end opposite to the first end being a probe tip;
   wherein the first electrode (31) extends to the probe tip;
   wherein the first electrode (31) is a hollow outer electrode and the second electrode (32) is an inner electrode extending at least along a section of the first electrode (31) inside the first electrode (31);
   wherein the second electrode (32) except for a portion at its end is surrounded by a dielectric material (33);
   wherein the probe (50) is adapted to be inserted into a root canal (3); and
   wherein the plasma jet device (30) is adapted to provide negative pulses at the second electrode (32) for producing the atmospheric pressure plasma at the tip of the second electrode (32).

2. Plasma jet device (30) according to claim 1 wherein the second electrode (32) is extending at least along 25 percent, preferably at least along 50 percent, more preferably at least along 75 percent of the length of the first electrode (31) inside the first electrode (31).

3. Plasma jet device (30) according to claim 1 wherein the second electrode (32) extends to the tip of the probe (50).

4. Plasma jet device (30) according to claim 1 wherein the first electrode (31) is of a tubular or conical shape and the second electrode (32) is arranged coaxially with the first electrode (31).

5. Plasma jet device (30) according to claim 1 wherein an outer diameter of the probe (50) is less than 1.8 mm, preferably less than 1.0 mm and more preferably less than 0.5 mm.

6. Plasma jet device (30) according to claim 1 wherein the second electrode (32) is a wire or a conductor on a substrate.

7. Plasma jet device (30) according to claim 1 wherein at least one of the electrodes (31, 32) comprises at least one element selected from the group consisting of copper, stainless steel, silver, gold, platinum, tantalum, brass, titanium, silicon, tungsten, nickel, molybdenum and ceramic.

8. Plasma jet device (30) according to claim 1 wherein the dielectric material (33) is one of a varnish, a polymer and a spacer for positioning the second electrode (32) relative to the first electrode (31).

9. Plasma jet device (30) according to claim 1 wherein the negative pulses have at least one of a current magnitude of 1 to 350 mA and a frequency of 1 Hz to 4 KHz.

10. Plasma jet device (30) according to claim 1 wherein the negative pulses are one of a rectangular, parabolic, saw tooth and a sinus shape.

11. Plasma jet device (30) according to claim 1 wherein the probe (50) is detachable and replaceable.

12. A system comprising
a plasma jet device (30) according to claim 1; and
a base station (20) electrically connected to the plasma jet device (30) and adapted to generate negative pulses.

13. A method for generating atmospheric pressure plasma comprising following steps:
providing a plasma jet device (30) comprising a probe (50) with a gas channel (54) and a first and second electrode (31, 32), the probe (50) having a second end being a probe tip,
wherein the first electrode (31) extends to the probe tip;
wherein the first electrode (31) is a hollow outer electrode and the second electrode (32) is an inner electrode extending at least along a section of the first electrode (31) inside the first electrode (31);
wherein the second electrode (32) except for a portion at its end is surrounded by a dielectric material (33), and
wherein the probe (50) is adapted to be inserted into a root canal (3);
guiding gas towards the probe tip;
generating negative pulses at the second electrode (32) for producing the atmospheric pressure plasma at the tip of the second electrode (32).

14. Method of claim 13 wherein the gas comprises at least one gas selected from the group consisting of oxygen and inert gases, preferably Helium, Neon, Argon and/or Nitrogen.

15. Method of claim 13 wherein the plasma jet device (30) comprises a plasma jet device (30) for medical treatment of root canals (3) using an atmospheric pressure plasma comprising:
a handle (40); and
a probe (50) with a gas channel (54) and a first and second electrode (31, 32), the probe (50) having a first end connected to the handle (40) and a second end opposite to the first end being a probe tip;
wherein the first electrode (31) extends to the probe tip;
wherein the first electrode (31) is a hollow outer electrode and the second electrode (32) is an inner electrode extending at least along a section of the first electrode (31) inside the first electrode (31);
wherein the second electrode (32) except for a portion at its end is surrounded by a dielectric material (33);
wherein the probe (50) is adapted to be inserted into a root canal (3); and
wherein the plasma jet device (30) is adapted to provide negative pulses at the second electrode (32) for producing the atmospheric pressure plasma at the tip of the second electrode (32).

* * * * *